Feb. 8, 1949.   J. H. CRUMBLE   2,461,037
FLUID POWER MACHINE
Filed May 27, 1944
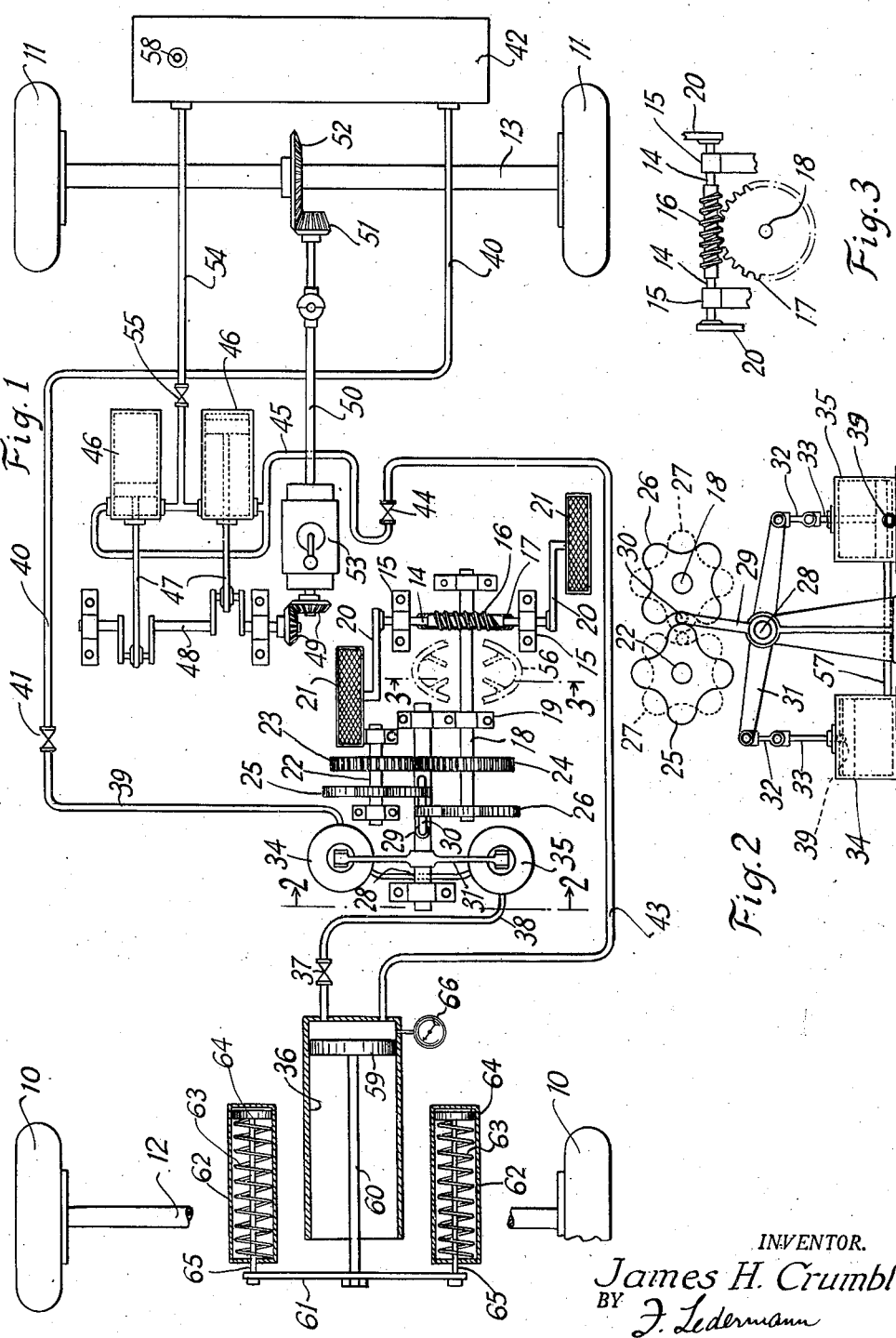
INVENTOR.
James H. Crumble
BY F. Ledermann
ATTORNEY Patented Feb. 8, 1949

2,461,037

UNITED STATES PATENT OFFICE 2,461,037

FLUID POWER MACHINE

James H. Crumble, Brooklyn, N. Y.

Application May 27, 1944, Serial No. 537,595

1 Claim. (Cl. 138—31)

This invention relates to pedal operated devices for storing up power ready for use at a future time, and more particularly as such devices may be applied to vehicles, and aims to provide a device whereby power may be stored in tanks by the actuation of a pedal driving means, whereby a vehicle may be propelled at a later time by utilization of the stored energy. The device is readily adaptable to the use of air, water, oil, or any other suitable fluid, but for the sake of simplification in the following description the device is set forth as utilizing oil.

Another object of the invention is the provision of a novel and positively acting means for reciprocation of the pistons of pumps for pumping the fluid into the tanks.

The above and other objects will become apparent in the description below, wherein characters of reference refer to like-numbered parts on the accompanying drawing. It is to be noted that the drawing is intended to serve the purpose of illustration only, and that it is neither intended nor desired to limit the invention necessarily to the specific details illustrated excepting insofar as they may be deemed essential to the invention.

Referring briefly to the drawings, Fig. 1 is a plan view of the device as applied to a vehicle, the latter being shown only fragmentarily.

Fig. 2 is a view taken on the line 2—2 of Fig. 1.

Fig. 3 is a view taken on the line 3—3 of Fig. 1.

Referring in detail to the drawings, the numerals 10 and 11 indicate the front and rear wheels, respectively, of a vehicle, not shown, the latter excepting the wheels and axles 12 and 13 being omitted as unnecessary to a proper comprehension of the invention.

A horizontal pedal shaft 14 is rotatably held against the frame of the vehicle, not shown, by bearing straps or supports 15. Directly beneath the shaft 14, whose mid-portion is worm-threaded, as at 16, is a worm gear 17 in mesh with the worm 16, the shaft 17 being mounted on a shaft 18 rotatably held to the frame, not shown, by bearing supports or straps of which but one is shown at 19. As it is not believed to be necessary to specify every such support for a shaft, it being understood that they are secured to some part or parts of the frame, not shown, reference to the same will hereinafter be omitted, as it is obvious that the various shafts shown are rotatably mounted in such straps or supports, and they are shown on the drawings. Pedal cranks 20 extend rigidly from the ends of the worm shaft 14 and are provided with pedals 21 in the usual fashion.

Adjacent and parallel therewith, that is, the shaft 18, is a second shaft 22 having a gear 23 rigid thereon and in mesh with a like gear 24 rigid on the shaft 18. On the extremity of the shaft 22 a cam wheel 25 is rigid on that shaft, and a like cam wheel 26 is rigid on the shaft 18 and lies in a plane paralel with the plane of the wheel 25. As shown in Fig. 2, the cam wheels 25 and 26 are each provided with four peripherally equi-distant cams 27, the wheels being so positioned with respect to each other that when the peak of one cam of one wheel is positioned in a horizontal plane the trough of the opposite cam of the other wheel is positioned in the same plane; in other words, the wheels are rotationally displaced from each other at an angle of 45 degrees.

Below and between the shafts 18 and 22, a rocker shaft 28 is pivotally mounted parallel with the former, and an arm 29 extends rigidly upward therefrom. The upper end of the arm 29 is bent at right angles thereto to form a pin or finger 30 which projects (in the same plane with the shaft 28) between the two cam wheels 25 and 26. It is apparent that, as the pedals are worked, the worm shaft 14 rotates the worm gear 17 and the shaft 18, the latter rotating the cam wheel 26 and causing the gear 24 to rotate the gear 23 and shaft 22, and hence the cam wheel 25, in the opposite direction. It is apparent from Fig. 2 that the pin or finger 30 will, as a result of the rotation in opposite directions of the wheels 25 and 26, be moved through an arc whose length is equal to the distance between the troughs of the cams of the two wheels. The action of the cam wheels is obvious, for as the wheel 26, for instance, rotates in a clockwise direction its cam just below the pin 30 will move the latter to the left, while simultaneously the adjacent cam of the wheel 25, moving counter-clockwise, will get out of the way of the pin. After the pin has thus been moved to the trough of the adjacent cam of the wheel 25, the next cam of that wheel will again move it to the right as the following cam of the wheel 26 moves out of the way. Hence, a rocking movement through four cycles is given the shaft 28 for each rotation of the shaft 18, or worm gear 17.

The rocker shaft 28 is provided with a rigid beam 31 having connecting rods 32 depending from its ends and pivoted to piston rods 33 of pump cylinders 34 and 35. The latter, owing to the short arc through which the beam 31 is swung, are short in length, that is, in stroke, and relatively large in diameter, in order to provide a maximum of power. The cylinders 34 and 35 are intended to represent fluid pumps adapted, upon actuation of their piston rods 33, to pump fluid, such as oil, for instance, into pipes. It is not necessary to show the construction of the pumps 34 and 35 in detail, as they function in the common manner of a reciprocating pump.

A storage cylinder 36 is mounted at any convenient place in the vehicle, and is provided with an inlet valve 37 connected with an inlet pipe 38. The pumps 34 and 35 are joined in series by a connecting pipe 57. The former is connected to the pipe 38 and the later has a pipe 39 extending therefrom. A pipe 40, joining the pipe 39 through a valve 41, leads to a second storage tank or reservoir 42 having a vent 58 in the top thereof. The tank 36 has an outlet pipe 43 having therein a valve 44 which may be positioned conveniently to the operator. The tank 36 may also be provided with a pressure gage 66.

The tank 36 further comprises a cylinder having a piston 59 slidable therein, with the piston rod 60 thereof extending out from the end, at the left, Fig. 1. A beam 61 is secured intermediate its length at right angles to the rod 60 and extends in both directions beyond the confines of the cylinder 36. Secured against opposite sides of the cylinder 36, or in any manner, with their axes parallel with that of the cylinder 36, are a pair of cylindrical housings 62 containing coiled springs 63 loosely mounted in the housings 62. Each housing 62 further contains a piston 64 slidable therein and having a piston rod 65 extending beyond the left-hand end of the housing. The rods 65 are secured to the ends of the beam 61. The springs 63 and the other associated parts just described are shown diagramatically but in actual practice they would be of substantial or heavy construction.

From the valve 44 an inlet pipe 45 leads into the cylinders 46 of a fluid motor provided with pistons whose rods 47 engage a crank shaft 48. By means of bevel gears 49 a drive shaft 50 is rotated by the shaft 49, and the shaft 50 has a pinion engaging a bevel gear 52 on the rear wheel shaft 13. A standard differential bearing could of course be substituted for the drive gears 51—52. A gear shift transmission, shown only generally at 53, may be provided so that more than one forward speed and one reverse may be had, in the usual manner. The tank 42 is connected with the motor cylinders 46 through an outlet pipe 54 from the latter, and this pipe has a valve 55 therein whereby exhaust oil from the motor flows into this tank.

A vehicle provided with the power means above described, may be utilized particularly either on isolated farms where other power is not available, or on children's vehicles. The charging of the cylinder 36 may be done during spare time, and when charged the vehicle is available for use at a later time, when needed. In a children's vehicle, which could be built to resemble an automobile, as is commonly done, this device could be used to advantage. The cylinder 36 could be charged by pedaling at any time, particularly while it is raining, and it could then be run under its own power when it has cleared. The pedalling would of course be an excellent exercise for the child.

Assuming that the oil in the system is lodged in the tank 42, operation of the pedals 21 will actuate the pumps 34 and 35 to pump the oil from the tank 42 through pipes 40, 39, 57, 38, into the cylinder 36, thus forcing the piston 59 toward the left against the pressure of the springs 63. As the pumping continues, the beam 61 moves farther outward, and at maximum capacity of the cylinder 36 the beam 61 will reach its extreme left-hand position, not shown. The valves 41 and 37 are then closed, cutting off communication between the cylinder 36 and tank 42 through the pumps 34 and 35. When valve 44, which has been closed during the pumping, is now opened, the retraction of the springs 63 will force the piston 59 toward the right to expel the oil from this cylinder under pressure through the pipes 43 and 45 into the motor cylinders 46, thereby actuating the latter to drive the vehicle until the stored energy in the springs has been spent.

Of course any other motor means than the reciprocating means 46 shown, may be used if desired, such as, for instance, a turbine. A steering wheel is shown at 56, in mere conventional manner, and of course the operator's seat, not shown, would be mounted somewhere convenient for ready accessibility to the pedals 21.

The cam wheels 25 and 26 and the rocker shaft 28 rocked thereby, provide a means for obtaining a plurality of the reciprocations of the pump per revolution of the cam wheels, which is an advantage over an eccentrically operated pump, as the latter would provide but one reciprocation per rotation of the eccentric or drive wheel. By increasing the number of the cams 27 on the cam wheels, the number of reciprocations per revolution would of course be increased. The worm drive between the pedal shaft and the shaft 18 is advantageous in that a minimum of effort is required in pedalling for the worm to rotate the worm gear. The degree of curvature of the cams 27 could of course be modified as found suitable, so that a minimum loss of power may be present between the cam wheels and the pin 30.

Obviously, modifications in form and structure may be made without departing from the spirit and scope of the invention.

I claim:

An accumulator comprising a fluid storage cylinder having an opening through the head end thereof, said cylinder having a piston slidable therein, said piston having a rod extending through the rear end of said cylinder, the free end of said rod having a beam secured thereon at right angles thereto, a pair of cylindrical housings mounted adjacent opposite sides of said cylinder with their axes parallel with the axis of said cylinder, said housings being positioned with their rear ends extending beyond the rear end of said cylinder and their front ends positioned intermediate the front and rear ends of said cylinder, pistons slidably mounted in said housings and having piston rods extending beyond the rear ends thereof, said last-named piston rods being secured to the ends of said beam, coiled springs in said housings surrounding said last-named piston rods and positioned between said last-named pistons and the rear ends of said housings, said cylinder being adapted to have a fluid pass through said opening.

JAMES H. CRUMBLE.

REFERENCES CITED

The following references are of record in the file of this patent:

UNITED STATES PATENTS

| Number | Name | Date |
|---|---|---|
| 498,888 | Rockwell | June 6, 1893 |
| 594,787 | Gallagher | Nov. 30, 1897 |
| 611,823 | Steiver | Oct. 4, 1898 |
| 710,889 | Prescott et al. | Oct. 7, 1902 |
| 912,502 | Squires | Feb. 16, 1909 |
| 1,244,271 | Witter | Oct. 23, 1917 |
| 1,780,705 | Forman | Nov. 4, 1930 |
| 2,149,623 | Nigro | Mar. 7, 1939 |
| 2,177,381 | Bichi | Oct. 24, 1939 |
| 2,240,011 | Casey | Apr. 29, 1941 |

FOREIGN PATENTS

| Number | Country | Date |
|---|---|---|
| 63,438 | Germany | July 19, 1892 |
| 129,366 | Switzerland | Oct. 12, 1927 |